United States Patent [19]

Milnes

[11] 4,438,323
[45] Mar. 20, 1984

[54] CARPET SEAMING TAPE ACTIVATOR

[76] Inventor: Kenneth B. Milnes, Box 134, Meadowbrook, Pa. 19046

[21] Appl. No.: 235,507

[22] Filed: Feb. 18, 1981

[51] Int. Cl.³ .......................... D06F 75/08; H05B 1/00
[52] U.S. Cl. ..................................... 219/243; 156/579; 156/304.7; 219/228; 219/254; 219/241
[58] Field of Search ............... 219/243, 245, 248, 258, 219/221, 227, 228, 254, 259, 214, 241, 240; 126/227; 156/579, 304.4, 304.7, 323, 304.3, 289; 38/88, 89, 93, 94

[56] References Cited

U.S. PATENT DOCUMENTS

| 2,123,415 | 7/1938 | Gorbatenko | 219/244 |
| 2,253,732 | 8/1941 | Segelin | 38/94 |
| 2,395,849 | 3/1946 | Collom | 219/241 |
| 2,483,715 | 10/1949 | Solon | 219/214 |
| 2,709,742 | 5/1955 | Perry | 156/579 |
| 2,751,966 | 6/1956 | Techtmann | 156/579 |
| 3,064,959 | 11/1962 | Eisenberg | 219/214 |
| 4,160,688 | 7/1979 | Brooks | 219/245 |
| 4,248,659 | 2/1981 | Bopst | 219/245 |

Primary Examiner—B. A. Reynolds
Assistant Examiner—Teresa J. Walberg
Attorney, Agent, or Firm—Paul & Paul

[57] ABSTRACT

The carpet seaming tape activator disclosed comprises a hand-operated electric iron having a base with an insulated bottom. The base of the iron defines a tunnel, through which heat-activated adhesive tape for carpet seaming can pass. The heating element of the iron is disposed inside the base, so that the adhesive on the tape is melted while the tape is entirely enclosed within the iron. The hot tape is thus temporarily isolated from the padding beneath, thereby avoiding damage to the padding and to the backing on the underside of the carpet, as well as avoiding the tendency of the carpet to adhere to the padding underneath.

16 Claims, 4 Drawing Figures

CARPET SEAMING TAPE ACTIVATOR

BACKGROUND OF THE INVENTION

This invention discloses an apparatus for seaming of carpets. It is known in the art to join two pieces of carpet over a piece of padding, by means of a heat-activated adhesive tape disposed along the seam. Carpet seaming tape has disposed upon it adhesive material which melts when heat is applied. While the adhesive still is in the molten state, two pieces of carpet can be joined along the tape to create a seam. The hot adhesive cools and hardens very quickly.

The means which has been commonly used to join carpet pieces has typically been a hand-operated electric iron, usually having a rectangular base. The iron is moved along the adhesive tape, causing the adhesive to melt, whereupon the pieces of carpet are pressed down upon the tape.

Several problems occur when using apparatus of the type described above. The high heat developed by the iron, which is typically heated to temperatures of about 380°–400° F., tends to damage the padding beneath the adhesive tape, particularly if the adhesive tape is thin and uninsulated. The heat also can damage the polypropylene backing of the carpet. Also, molten adhesive tends to seep through the tape, or around it, causing the carpet to adhere to the padding underneath. When the carpet is stretched, after seaming, the adhesion to the padding causes the carpet to become wrinkled. Another problem encountered in the use of apparatus of the type known in the prior art is due to the pressure applied by the operator of the iron to the adhesive tape. Unless the tape is reasonably thick and sturdy, the tape may break under the pressure applied by the operator while pressing down on the iron.

Still another problem encountered in the prior art is the inability of an operator to know how fast to move the iron along the adhesive tape. It is desirable to move the iron quickly along the adhesive tape, thereby reducing the time and labor costs required to complete a job. But in order to shorten the time needed, one needs to increase the temperature of the iron, thereby increasing the risk that, if the iron is not moved sufficiently rapidly, excessive heat will cause damage, for the reasons described above. Also, even if the temperature of the iron is not too high, the iron, if moved too slowly, may still cause heat damage. The present invention includes a feature which tells the operator of the apparatus how fast to move the iron.

SUMMARY OF THE INVENTION

The present invention solves the problems described above by providing a hand-operated electric iron having a base portion with an insulated bottom. The base portion defines a tunnel through which heat-activated adhesive tape can be passed. Within the base portion, and above the adhesive tape, is the electric heating element of the iron. The adhesive tape is heated while it is within the iron, and is entirely enclosed, not touching the padding below. The adhesive on the tape is melted due to the heat generated within the base. As the iron is moved, the heated portion of the tape leaves the iron, and a new, unheated portion of tape enters. (In practice, one end of the tape would be anchored to the floor, so that the movement of the iron will cause the tape to pass through the tunnel as described). As the tape exits from the interior of the iron, the adhesive is still melted, though at slightly reduced temperature, but the adhesive is sufficiently sticky to permit the joining of two pieces of carpet along a seam.

Within the base of the iron is a thermocouple which is positioned to sense the temperature of the molten adhesive while the tape is still within the iron. The thermocouple is operatively connected to an indicator light on the iron. When the temperature of the adhesive is sufficiently high, the indicator light turns on, thereby indicating to the operator that the iron may be moved, the adhesive tape having been heated sufficiently. If the operator moves the iron too quickly, however, the thermocouple will rub against a part of the tape which has not yet received much heat, and the indicator will turn off, indicating to the operator that it is necessary to move the iron more slowly, to allow sufficient heat to be generated to melt the adhesive.

Accordingly, it is a primary object of the present invention to provide a carpet seaming tape activator which tends to eliminate the problem of heat damage to padding, and which also tends to eliminate the problem of unwanted adhesion of a carpet to the padding underneath.

It is a further object of the present invention to provide a carpet seaming tape activator which effectively isolates the seaming tape, while it is being heated, from the padding below.

It is a further object of the present invention to provide a carpet seaming tape activator which retains a clean bottom, which can be rested on a carpet without damaging or soiling the carpet.

It is a further object of the present invention to provide an apparatus as described above, which has means for indicating to the operator whether the apparatus is being moved too rapidly along the seam.

It is a further object of the present invention to provide an apparatus as described above, having more than one temperature setting.

It is a further object of the present invention to provide an apparatus as described above, which apparatus is efficient in its use of heat generated within the iron to melt the adhesive on the tape.

Other objects and advantages of the present invention will be apparent to those skilled in the art from a reading of the following brief description of the drawings, the detailed description of the invention, and the appended claims.

DETAILED DESCRIPTION OF THE INVENTION

Although the apparatus disclosed in the invention is described as an "iron" it should be understood that the device is not a true "iron," as it performs no ironing function. The apparatus is designated an iron because of its visual resemblance to a conventional said iron. However, the "iron" of the present invention is not used to apply downward pressure, but is instead a heated tunnel through which adhesive tape passes.

Figure 1:
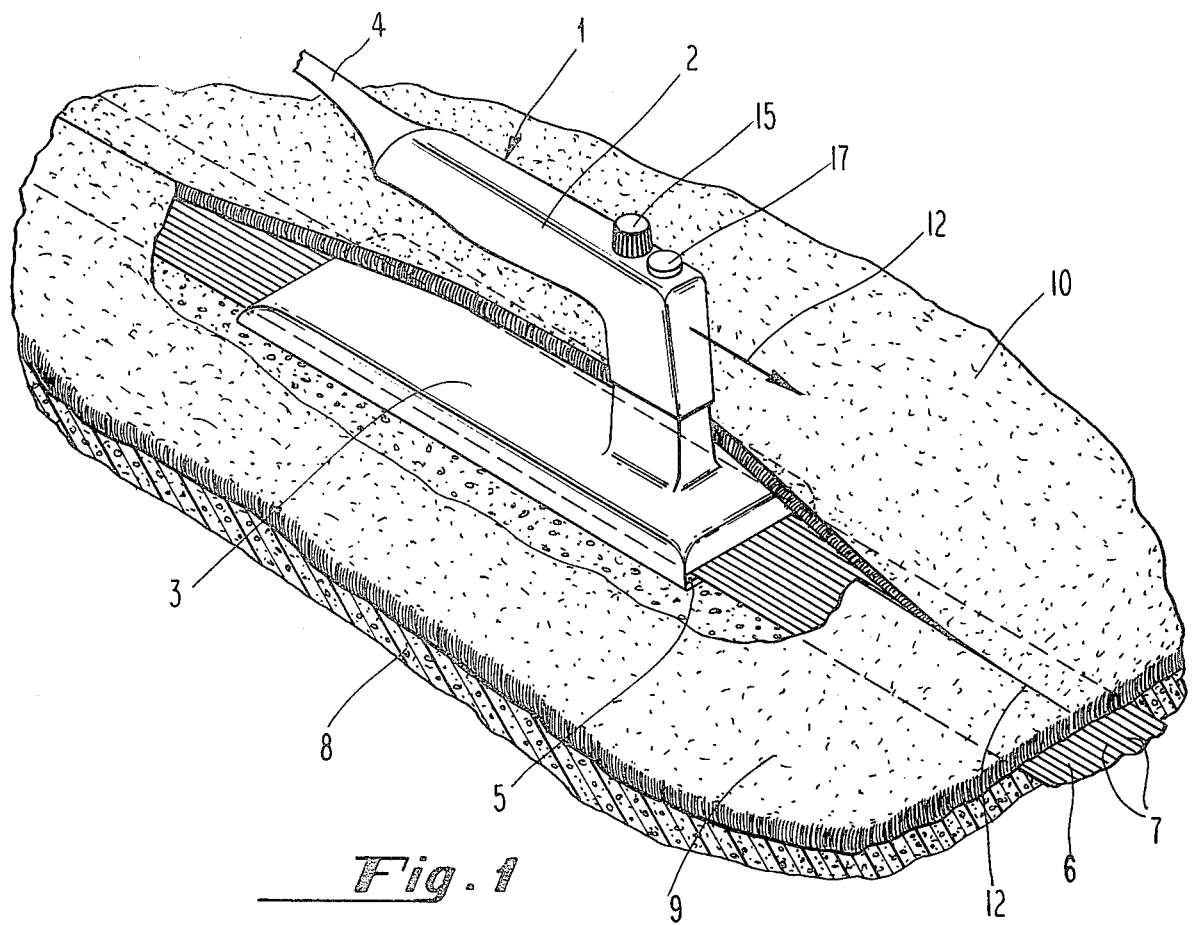
FIG. 1 is a perspective view showing the apparatus of the present invention in operation, and also showing pieces of carpet and padding in cut-away cross section.

In FIG. 1, there is shown, in perspective, a view of the present invention in operation. Carpet seaming tape activator 1 comprises a hand-operated iron, which iron comprises a handle portion 2 and a base portion 3. Electricity for powering the iron is delivered through cord 4 from a suitable power source (not shown). As seen in FIG. 1, base portion 3 contains an opening 5 through which a heat-activated carpet seaming tape 6 may pass. Disposed along tape 6, in substantially parallel rows, are tracks 7 of adhesive material.

Adhesive tape 6 rests upon padding 8. Above the padding are shown two pieces 9 and 10 of carpet, which pieces are to be joined along seam 12.

That portion of tape 6 which is disposed within the base portion 3 of iron 1 is heated, thereby causing the adhesive in tracks 7 to melt. As the iron 1 is moved in the direction indicated by arrow 12, hot tape is caused to exit from the base, with molten adhesive thereon. (It is assumed that the tape has been suitably fastened to the floor so that the tape will pass through when the iron is moved.) As the iron is moved along the seam, the carpet pieces 9 and 10 are pressed over the tape 6.

A temperature adjusting knob 15 is mounted on handle 2. The knob is operatively connected to a variable resistance of conventional type (not shown), the variable resistance being capable of regulating the amount of power delivered via cord 4 to the heating element (to be described below). Knob 15 is used to adjust the temperature within the base portion 3 to be in the desired range. In the preferred embodiment, the carpet seaming tape activator can be set at either 250° F. or 350° F. These temperatures are somewhat lower than those sometimes used in the prior art. It is desirable to use temperatures as low as practicable, in order to reduce further the likelihood of heat damage to the padding. Also included on iron 1 is indicator light 17, which tells the operator whether the iron is being moved too rapidly. The function of indicator 17 will be more fully described below.

Figure 2:
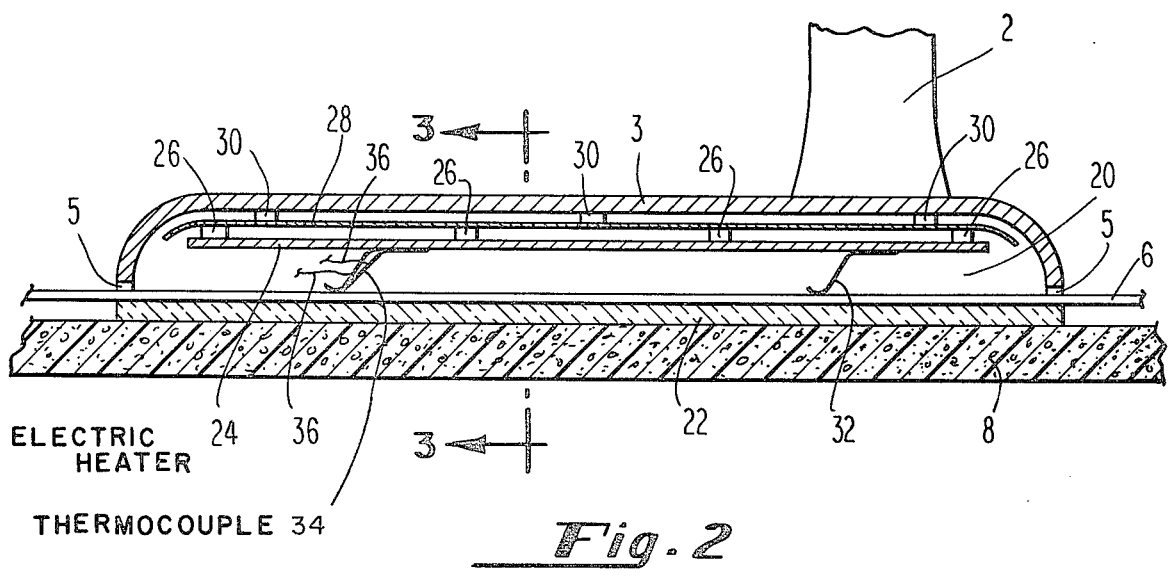
FIG. 2 is a cross-sectional view taken lengthwise along the apparatus, showing the interior of the carpet seaming tape activator, together with an adhesive tape passing through it.

FIG. 2 illustrates, in cross section, the structure of the interior of the carpet seaming tape activator. Base portion 3 of the apparatus defines a tunnel area 20 through which adhesive tape 6 passes. This tunnel is bounded by the base portion 3, and by insulated bottom 22. Entrance or exit from the tunnel is through the openings 5. Bottom 22 tends to prevent transmission of heat from the tunnel area 20 to the padding 8 beneath the iron. Electric heating element 24 is shown as a rectangular member, which may be about 2"×8" in area and about (¼)" thick, mounted by supports 26 to a highly polished reflecting mirror 28 which itself is mounted to base portion 3 by supports 30. The purpose of mirror 28 is to reflect heat from heating element 24 back towards adhesive tape 6. The highly polished reflector can reflect up to 90% of the heat incident upon it. Thus, a greater percentage of the heat from the heating element 24 is used, making the apparatus more energy efficient. Also, the reflection of heat by mirror 28 tends to reduce the temperature of the top of the base 3, thereby minimizing the possibility of heat damage to the synthetic backing of the carpet.

Also shown in FIG. 2 is strut 32, which is mounted between heating element 24 and the adhesive tape 6. Strut 32 serves to hold the tape 6 in place as it passes through the iron. Also shown in FIG. 2 is thermocouple 34 which functions partly as a strut, similar to strut 32, and partly as a temperature-sensing means. The thermocouple 34 is disposed so as to sense the temperature of the molten adhesive on tape 6. The output of the thermocouple is transmitted via leads 36, and the signal from the thermocouple 34 is connected, through conventional circuitry, such as a mechanical relay or an electronic amplifier (not shown) to operate indicator light 17 (shown in FIG. 1).

A shield (not shown) can be mounted around the thermocouple to protect the thermocouple from direct heat from the heating element, thereby insuring more reliable temperature sensing by the thermocouple.

Figure 3:
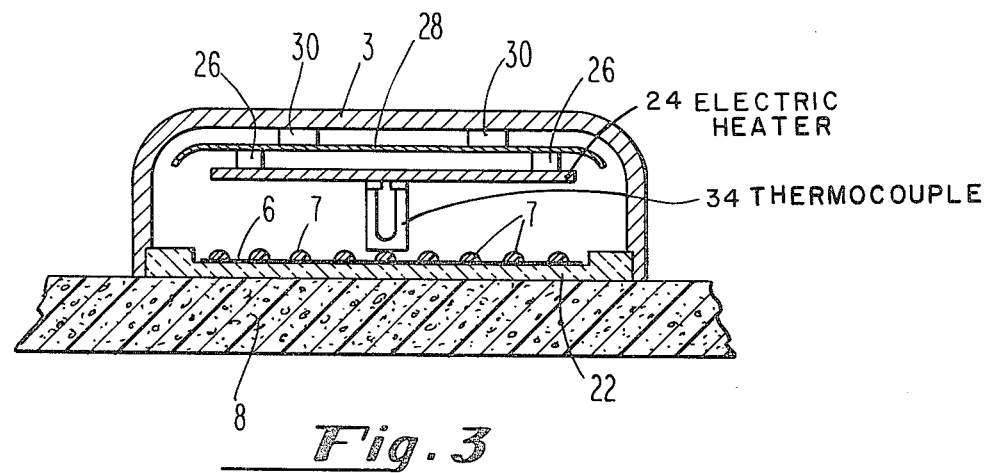
FIG. 3 is a cross-sectional view of the width of the apparatus of the present invention, taken along the line 3—3 of FIG. 2.

FIG. 3 is another cross sectional view, taken along the line 3—3 of FIG. 2. In this figure, the structure of the heat-activated tape is more clearly visible. The tape 6 is seen to have raised tracks 7 of adhesive disposed along the tape, as was illustrated more schematically in FIG. 1. In FIG. 3, there is also shown thermocouple 34, as well as heating element 24 and mirror 28. FIG. 3 also shows more clearly the insulated bottom 22.

Note that, except for the struts (which include the thermocouple), the apparatus does not touch the adhesive. This feature is in sharp contrast to the irons of the prior art, which directly touch the adhesive, and which therefore require much cleaning. Also, since the iron does not rest upon the tape, the tape instead being threaded through the iron, it is possible to use very thin tapes, of the order of 0.015–0.025 inches thick. No pressure of an iron is applied to the tape, as is the case in the prior art.

Figure 4:
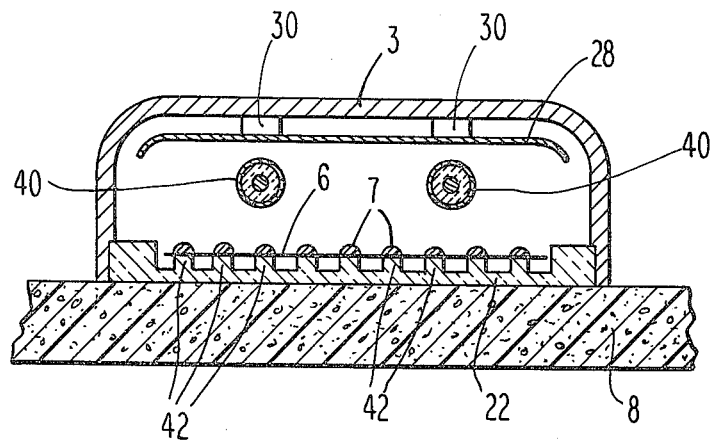
FIG. 4 is a view of an alternative embodiment of the present invention, taken along a direction similar to that of FIG. 3.

FIG. 4 shows an alternative embodiment of the invention. In FIG. 4, reference numerals corresponding to those used for FIGS. 1-3 represent identical elements. In FIG. 4, there are two differences from the embodiment described previously. First, the heating elements 40 are cylindrical members disposed along the length of the iron. These members are preferably resistive heating elements, such as those sold under the trade name U-RAD (U-RAD is a registered trademark of the Edwin L. Wiegand Co.) The second different feature of this embodiment is the ribbed structure of the bottom portion 22. Bottom 22 has ribs 42, which reduce the amount of surface contact between the bottom 22 and adhesive tape 6. This reduction in surface contact further reduces the transmission of heat between the tape and the padding 8 beneath. Of course, either one of these two additional features could be incorporated in the embodiment described previously.

In operation, an adhesive tape is threaded through the openings 5 of the tunnel 20, and is then anchored to the floor. The iron is turned on, and when the indicator 17 lights, the apparatus is moved along the seam at about 3-4 feet per minute. If the indicator light should turn off, the operator must move the iron more slowly, giving the adhesive, on the tape, sufficient time to melt. When the adhesive is sufficiently hot (and melted), the indicator light will turn on again.

If the higher temperature is selected by knob 15, it is possible to seam a carpet about twice as rapidly, as long as the operator is careful to press the carpet firmly onto the molten adhesive.

When the apparatus reaches a wall, at the end of a seam, the tape is cut to length and pulled through the apparatus by moving the activator up the wall. Since there is no adhesive on the bottom of the iron, the iron may be placed on the carpet temporarily. If the bottom is further equipped with runners (not shown), the tendency to damage the carpet by heat would be still further reduced.

The electric requirement of the apparatus described herein is about 40 watts per square inch of adhesive, when seaming at the rate of 3-4 feet per minute.

Since the apparatus permits the use of thinner tape (there being no downward pressure on the tape from the iron), it is possible to use less heat to melt the adhesive, and thus the speed of operation is increased. It has been found that the use of the invention can achieve a 30-40% saving in labor costs.

Other advantages of the invention include the fact that the apparatus yields a flatter, smoother seam, which does not show on sheer carpeting. Also, there is no need to clean the bottom of the iron, after use, as is the case with the irons of the prior art.

Although the invention has been described in connection with the use of adhesive tape of the type having raised tracks of adhesive, the invention could be used with other types of tape. Other tapes may have adhesive coated uniformly over the surface of the tape. But the principle of operation of the invention is the same, and the invention is not to be deemed limited by the particular type of adhesive tape which passes through the iron.

Further protection of the padding from possible heat damage can be obtained by equipping the bottom of the iron with runners, thus further decreasing the surface contact between the padding and the iron.

The apparatus can be made to open lengthwise, like a clamshell, for servicing.

It is understood that other modifications of the present invention are possible, within the scope of the claims. As stated above, different configurations of heating elements are possible. Varying cross sections of the bottom portion can be used. Variations in the number and location of the struts are also possible. The degree of adjustability of the temperature of the heating element can also be varied. It is entirely within the scope of this invention to be able to vary the temperature continuously, or in discrete steps. It is therefore to be understood that these and other modifications are to be deemed included within the spirit and scope of the following claims.

What is claimed is:

1. Carpet seaming apparatus comprising:
    a heating means having an enclosed tunnel, said tunnel being adapted to receive a heat-activated adhesive tape through said tunnel;
    said heating means having an insulated bottom, said bottom comprising means for supporting the tape while the tape is within the tunnel;
    an electrical heating element disposed within the tunnel; a heat reflecting means, mounted within the tunnel and above the heating element;
    at least one strut disposed, within the tunnel, between the heating element and the bottom; and
    a thermocouple, disposed within the tunnel and positioned to sense the temperature of the heat-activated adhesive tape.

2. The apparatus of claim 1, the thermocouple being operatively connected to an indicator, the indicator being mounted on the heating means, the indicator being adapted to signal the attainment by the thermocouple of a predetermined temperature.

3. The apparatus of claim 2, wherein the heating means comprises a hand-operated electric iron.

4. The apparatus of claim 3, the iron comprising a handle, the apparatus further comprising means for adjusting the temperature of the iron, the adjusting means being mounted on the handle.

5. The apparatus of claim 1, wherein the heating element comprises a substantially rectangular member.

6. The apparatus of claim 1, wherein the heating element comprises at least one cylindrical member disposed within the tunnel.

7. The apparatus of claim 6, wherein the bottom comprises a ribbed plate, the plate being adapted to support the tape while the tape is within the tunnel.

8. The apparatus of claim 2, wherein there are two struts, and wherein the thermocouple comprises one of the struts.

9. The apparatus of claim 8, wherein the indicator comprises an electric light bulb.

10. An apparatus for seaming two pieces of carpet over a piece of padding, comprising a hand-operated electric iron, the iron having a base, the base having an insulated bottom, the base defining an enclosed tunnel adapted for the passage therethrough of a heat-activated adhesive tape, wherein the tunnel is of sufficient height within the base, to house an electric heating element, the heating element being disposed above the level of the adhesive tape, wherein the adhesive tape, while disposed within the tunnel, does not touch the padding underneath the iron.

11. The apparatus of claim 10, wherein the base of the iron has a forward and a rearward portion, and wherein the tunnel terminates in two slits disposed at the forward and rearward portions.

12. The apparatus of claim 11, further comprising a pair of struts positioned, within the tunnel, to hold an adhesive tape against the inner surface of the bottom of the base of the iron.

13. The apparatus of claim 12, wherein one of the struts comprises a thermocouple positioned to sense the temperature of the adhesive of a heat-activated adhesive tape passing through the tunnel.

14. The apparatus of claim 13, wherein the thermocouple is operatively connected to an indicator, the indicator being mounted on the iron, the indicator being capable of producing a signal when the temperature of the adhesive attains a predetermined value.

15. The apparatus of claim 14, further comprising means for adjusting the temperature of the heating element.

16. An apparatus for seaming two pieces of carpet over a surface, comprising a hand-operated electric iron, the iron having a base, the base having an insulated bottom, the base defining an enclosed tunnel adapted for the passage therethrough of a heat-activated adhesive tape, wherein the tunnel is of sufficient height within the base, to house an electric heating element, the heating element being disposed above the level of the adhesive tape, wherein the adhesive tape, while disposed within the tunnel, does not touch the surface underneath the iron.

* * * * *